UNITED STATES PATENT OFFICE.

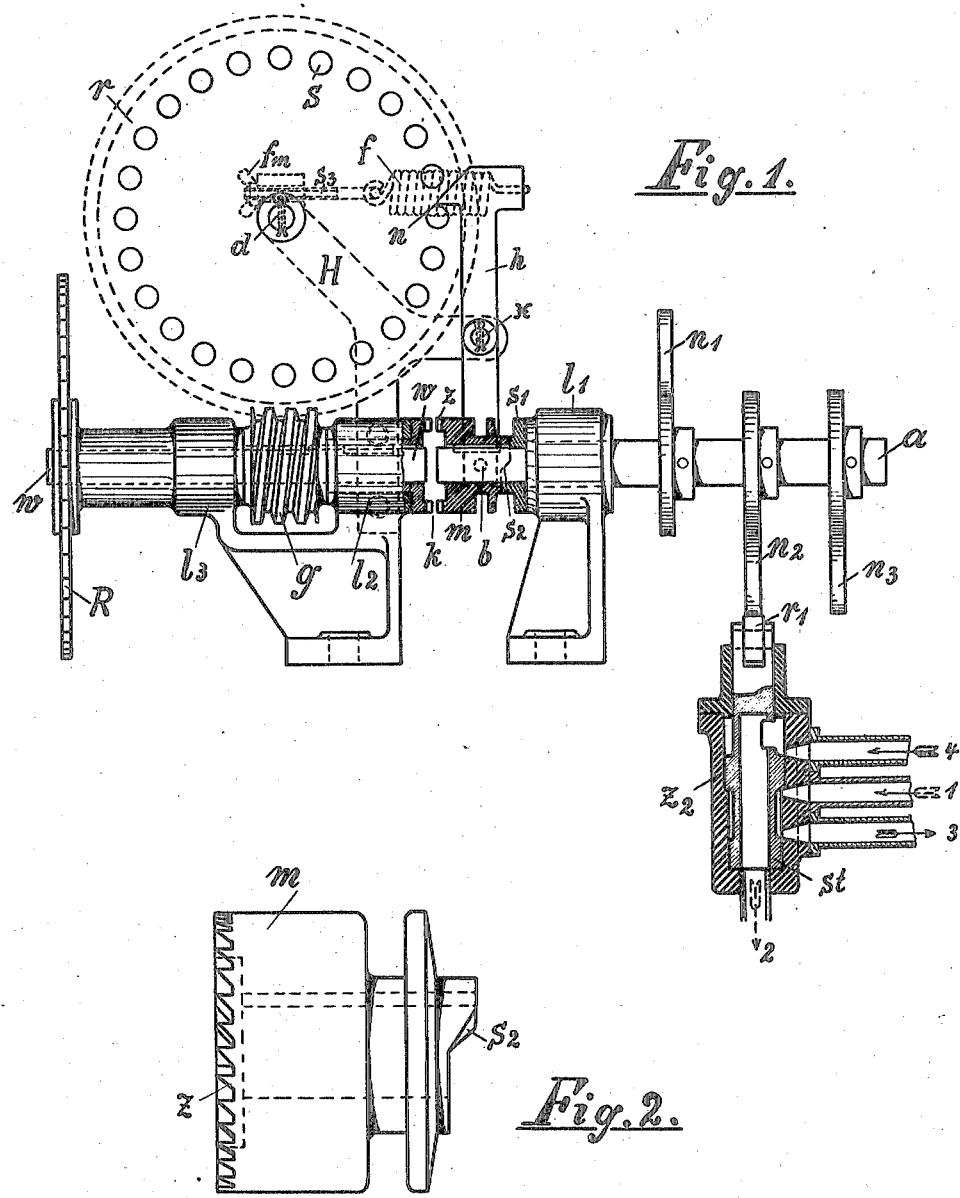

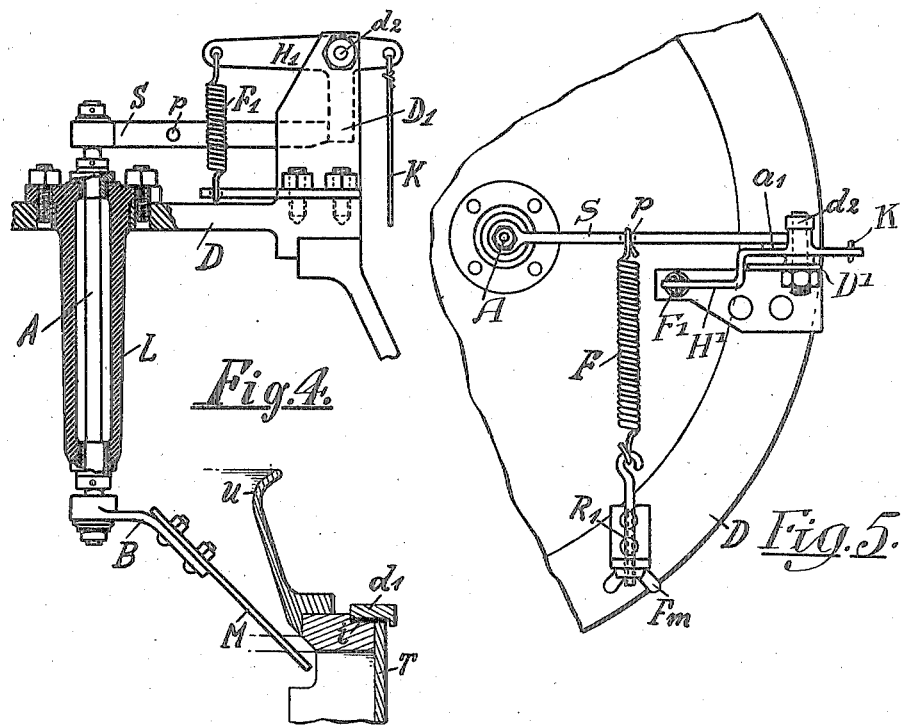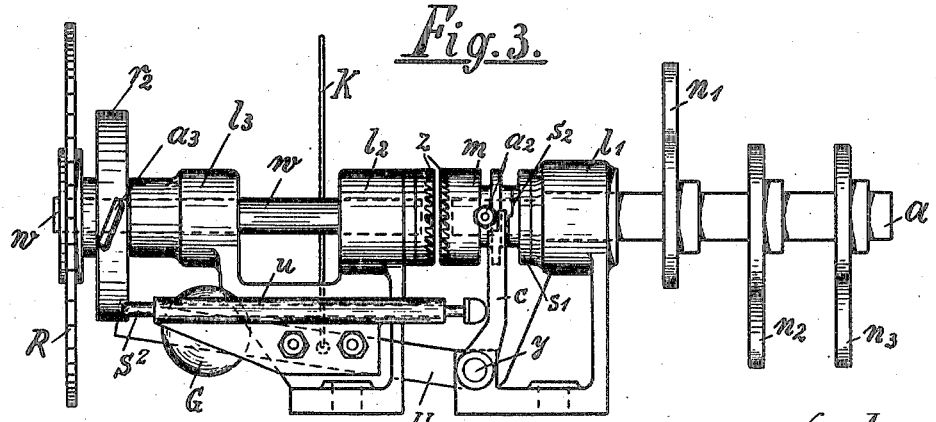

GUSTAV TER MEER, OF HANOVER, GERMANY.

MECHANISM FOR CONTROLLING THE OPERATION OF MACHINES AND APPARATUS.

1,284,125.      Specification of Letters Patent.    Patented Nov. 5, 1918.

Application filed December 10, 1913. Serial No. 805,693.

*To all whom it may concern:*

Be it known that I, GUSTAV TER MEER, a subject of the Emperor of Germany, and resident of Hanover, in the Province of Hanover and State of Prussia, Germany, have invented certain new and useful Improvements in Mechanism for Controlling the Operation of Machines and Apparatus, of which the following is a specification.

My invention is designed for use in connection with various different kinds of machines and apparatus in which it is desired that certain functions, operations or series of steps be automatically repeated in the proper sequence at regular or controllable intervals, for instance, at the beginning or ending of a main working period. By means of my invention I am able to positively insure the performance of such functions, operations or series of steps in uninterrupted succession in a fixed period at the proper time in the working cycle of the machine or apparatus. This may be either after a predetermined time interval, or after a predetermined number of rotations or other operations going to make up the main working period of the machine or apparatus, or as an incident to said main working period, or after a main working period variable either at the option of the operator or automatically upon the production or arrival of a predetermined condition or state of the material received, operated on, or discharged. My invention in its broad aspect is not limited for use in connection with any particular type of machine or apparatus. During the main working period material may be operated upon to effect a chemical change, a mechanical separation, filtration or mixing, a change in temperature, fluidity or pulverization, or merely a change in position as for instance, the winding of sheet material. At the end of the main working period the operations, functions or series of steps may be of any desired character dependent upon the material operated on and the character of the work done in the main working period. The mechanical removal of the charge and the admission of a fresh charge is a simple example although they may include innumerable others such as adding ingredients or admitting wash water or steam to the working chamber, after the discharge of load.

As a typical example of a machine in connection with which my invention is particularly useful I might mention a centrifugal machine for separating the solid matter from sludge, slime or sewage. In my Patent No. 1,094,230, issued April 21st, 1914, I have illustrated such a machine in which the following operations or steps are performed at the end of the main working period.

(1) Shutting off the supply of material, operated on, after a sufficient quantity has entered the drum or has gone through the same, so that the drum is filled up to the desired limit with solid material.

(2) Inserting siphon pipe to take out the liquid remaining in the drum and not able to flow out over the overflow-edge.

(3) Removing the siphon-pipe.

(4) Opening the drum casing, to permit the discharge of material.

(5) Closing the drum casing.

(6) Admitting fresh material by opening the supply conduit.

In this or other machines having a periodical discharge it is to be desired that all functions repeated in a certain sequence at intervals during the operation of the machine, be automatically regulated, but it is also desired that it be possible for the operator to set the duration of the main working period or interval according to variations in the material operated on. For instance, the filling of the drum of the centrifugal machine with solid material will be accomplished in a shorter or longer time dependent upon the composition of the material admitted. Consequently the regulation device must allow of an easy and quick regulation of the length of this time interval or working period. The other operations take place independently of the condition of the material and in uninterrupted succession, each during a fixed time period for a single operation. The time after the operation stated under (6)—to wit, admitting fresh material, and before the operation stated under (1), to wit, the shutting off of the supply requires a very large margin and must be determined according to the kind of material, so that before the shutting-off of the supply the drum is filled with material up to a certain limit.

If all of the material operated on be of uniform character the main working may be automatically terminated by the starting of the other operations after a definite time interval. If the character of the material be variable the working period may be terminated either automatically or manually when a predetermined quantity of solid material has accumulated in the drum.

I wish it definitely understood that my broad invention is not limited in its use with such an apparatus as that shown in said application, but may be used with other types of centrifugal machines, or with machines or apparatus designed for entirely different purposes, and in which a predetermined series of steps or operations take place at intervals. In the accompanying drawings, I have illustrated two forms which my invention may assume, but as various changes may be made in details of construction and arrangement of parts within the scope of my invention as defined in the appended claims, I desire these drawings to be considered in an illustrative rather than in a limiting sense.

In these drawings, in which similar reference characters indicate corresponding parts in the several views, Figure 1 is a side elevation of one form of apparatus, certain parts being shown in section;

Fig. 2 is an enlarged view of the movable clutch collar shown in Fig. 1;

Fig. 3 is a side elevation of a slightly modified form of apparatus;

Fig. 4 is a side elevation partly in section, of a portion of a controlling mechanism for the device shown in Fig. 3, the mechanism being illustrated in operative position in respect to a portion of a centrifugal machine; and Fig. 5 is a top plan view of the mechanism shown in Fig. 4.

In the specific form illustrated in Fig. 1, I employ a shaft $a$ mounted in a suitable bearing $1^1$ and provided with means for setting in operation the mechanisms for performing the separate steps or operations when said shaft is rotated. The shaft $a$ is stationary during the main working period of the machine in connection with which it is employed, and is intermittently and automatically rotated one complete revolution at the end of said main working period and is then locked against further operation as will be hereinafter more particularly described. The rotation of the shaft may operate to set the mechanism or the various different mechanisms of the machine in operation in any suitable manner, as for instance by cams mounted in operative position in respect to certain movable parts. The character of these parts will of course depend upon the nature of the machine in connection with which my improved mechanism is employed, and therefore, I do not wish to be limited to any specific means for transmitting motion from the shaft $a$ to the parts of the machine controlled by my improved mechanism. As a simple and efficient power transmitting device which is particularly adapted for use in connection with the centrifugal machine illustrated in my co-pending application above referred to, I have shown the shaft $a$ provided with three cams $n^1$, $n^2$ and $n^3$. Adjacent to each cam I provide a valve casing $z^2$, the longitudinally movable valve $st$ of which terminates adjacent to the periphery of the corresponding cam. To avoid confusion in the drawing I have only illustrated one of these valves and valve casings, but it is evident of course that I contemplate the employment of a separate one for each cam. Each valve $st$ is held in engagement with the cam, by fluid pressure or other means and friction may be reduced if desired by an anti-friction roller $r^1$ following the curve of the cam. Each valve serves to control the flow of a fluid under pressure to a piston, diaphragm or other operating part of the main machine. With the valve depressed as shown, the fluid under pressure which is supplied through a conduit 1, may flow through the conduit 3 to the piston, diaphragm or other movable operating member of the machine. The exhaust fluid from the opposite side of said piston, diaphragm or other member may return through the conduit 4, and escape to the exhaust conduit 2. With the valve in raised position the fluid under pressure entering through the conduit 1, will be delivered to the conduit 4, and the conduit 3 will be in communication with the exhaust conduit 2. I do not claim any particular improvement in this piston valve and coöperating parts, in this application. The cams $n^1$, $n^2$ and $n^3$ are rotatably adjustable on the shaft $a$ so that the timing of the engagement of the several cams with the valves or other mechanisms operated thereby may be readily regulated at will.

When using the mechanism in connection with the centrifugal machine illustrated in my co-pending application above referred to, the valve operated by one cam may control, through the transmission of pneumatic or hydraulic pressure, the operation of the gate or valve admitting material to the machine; another cam may control the insertion and removal of the siphon for taking off the liquid remaining in the drum and the third cam may control the opening and closing of the drum chamber for the intermittent discharge of the dried material. As the cams each make a complete revolution with the shaft $a$ and are then stopped as hereinafter described, it will be noted that the separate operations brought about by the movement of the separate cams will follow each other in the desired order, and all of the operations will be effected during the time required for one rotation of the shaft and the cams thereon. The speed at which the shaft $a$ is rotated will of course be regulated in accordance with the necessary time to perform the several operations which are controlled by my improved mechanism. The time interval between successive rotations of the shaft $a$ will be regulated in accordance with the time interval required for the main working period of the machine.

For driving the cam shaft $a$ intermittently and through successive separate complete revolutions I provide a shaft $w$ in alinement with the shaft $a$, but normally disconnected therefrom. The shaft $w$ is mounted in suitable bearings $1^2$ and $1^3$, and is continuously driven at a uniform rate in any suitable manner. This may be by means of a sprocket wheel R receiving its power from some rotating part of the machine. As the shaft $w$ is intermittently connected to the shaft $a$ to drive the latter I use such gearing that the shaft $w$ makes one revolution in a time interval equal to that necessary for accomplishing the various operations or steps controlled by the cams on the shaft $a$.

For operatively connecting the shafts $a$ and $w$ I provide the shaft $w$ with a clutch collar $k$ keyed thereto, so as to rotate therewith. On the shaft $a$ I provide a clutch collar $m$ held against rotation in respect to said shaft, but free to move longitudinally thereof toward and from the clutch collar $k$. The opposed faces of the two clutch collars are provided with teeth $z$, which may be of any desired shape but are preferably of the form shown in Fig. 2.

On the shaft $w$ is a worm $g$ meshing with a worm wheel $r$ to rotate the latter, said worm wheel being mounted in any suitable manner as for instance in a bracket H. The size of this worm wheel and the pitch of the worm are such in respect to the speed of rotation of the shaft $w$ that one revolution of the worm wheel $r$ will bear a different relationship to the normal time interval required for the main working period of the machine. Mechanism is provided whereby the clutch collar $m$ will be intermittently moved into operative engagement with the clutch collar $k$ to rotate the shaft $a$ during the rotation of the worm wheel $r$. If the worm wheel $r$ makes one complete rotation during the normal working period of the machine, the worm wheel $r$ may operate this mechanism to bring the clutch collars together once during each revolution. A simple mechanism which may be provided to accomplish this result is a lever $h$ supported on a pivot $x$ and having one end carrying a pin $b$, projecting into an annular groove on the clutch collar $m$. The opposite end of the lever $h$ may present a cam face $n$ in the path of a pin $s$ projecting outwardly from the face of the worm wheel. The worm wheel is preferably provided with an annular row of openings into any one of which the pin $s$ may be inserted and the lever $h$ is held with the clutch collar $m$ out of operative position and with the cam face $n$ in the path of the pin by means of a suitable spring $f$. The tension of this spring may be regulated by the endwise adjustment of a link $s^3$, connected to the spring and held in place by a nut $fm$.

To insure the holding of the clutch collar $m$ in operative position to produce one complete revolution of the shaft $a$ I provide the bearing $1^1$, with a stationary collar $s^1$, presenting a cam face engaging with a corresponding cam face $s^2$, on the clutch collar $m$. These cam faces are such that the clutch collar $m$ after being moved endwise into engagement with the clutch collar $k$ and partly rotated, can not be moved out of engagement with the clutch collar $k$ until one complete revolution has been made. Thus it is not necessary for the lever $h$ to hold the clutch collar $m$ in position for more than a very brief instant to insure the desired complete revolution of the shaft $a$, which results in spite of the tendency of the spring $f$ to disengage the clutch and irrespective of the engagement of the cam $n$ with the pin $s$. These cam surfaces on the clutch collar $m$ and the stationary collar $s^1$ not only prevent the shaft $a$ from stopping before one revolution has been completed, but they also insure the normal retaining of the shaft $a$ and its cams $n^1$, $n^2$ and $n^3$ in the proper starting position.

If the main working period of the machine occupies but a comparatively short time interval, the worm wheel $r$ may be provided with a plurality of pins spaced apart to the desired distance so that each pin $s$ in passing the cam $n$ will bring about a rotation of the shaft $a$ and the performance of the several steps controlled by the several cams on said shaft. If the operator desires to lengthen or shorten the required time for the main working period of the machine due to irregularity in the character of the material operated upon, he may remove the pin $s$ and replace it in a retarded or advanced position. Thus the series of steps or succession of operations will automatically take place after time intervals, the length of which may be automatically controlled by the operator. The operations controlled by the rotation of the shaft $a$ will be effected in the proper sequence, each in its proper time interval in the cycle irrespective of variations in the length of the main working period.

As above indicated the specific device illustrated in Fig. 1 is designed primarily for use where the material operated upon is of substantially uniform character so that the main working periods will be substantially uniform and each will require a time equal to the time of one complete revolution of the worm wheel $r$ or of a predetermined fractional part thereof, as for instance onehalf or one-third. It is also noted that this time period could be varied by a manual removing and replacing of the pin or pins $s$. If desired I may automatically control the machine irrespective of definite time intervals and in accordance with the variations in the character of the material. This means may be actuated by the material itself. If the device is to be used in connection with a centrifugal machine in which solid material is separated from liquid material by settling to the periphery of a rotary drum, I may employ a device one specific form of which is illustrated in Figs. 3, 4 and 5. Broadly this device includes a member supported from a stationary part of the centrifugal machine and projecting into the drum so that when the solid material has accumulated in the drum to a predetermined extent, it will engage with the said member and operate the latter to effect the engagement of the clutch. The member may be so mounted that it will not be operated when projecting into liquid in the drum, but will only be operated by encountering solid material. In the specific form illustrated in Fig. 4 the upper stationary portion D of the casing of the centrifugal machine supports a vertically disposed bearing L within which is mounted a shaft or pivot pin A projecting down toward the interior of the drum T. At the lower end of this shaft there is a knife blade M or other suitable member secured thereto by a bracket B and terminating in such position within the drum that it will engage with the solid material when the latter has accumulated to the desired extent. The specific character of the drum T forms no portion of my present invention, although that illustrated is similar to the drum shown in my co-pending application above referred to. This drum includes a top or lid having a wall portion $u$ over which the liquid may flow after the solid material has settled toward the peripheral wall of the drum. The peripheral wall is preferably downwardly movable in respect to the bottom and top to permit a discharge of the solid material, and when in closed position engages with a gasket $i$ on the under side of a flange $d^1$ of the top.

At the upper end of the shaft A and outside of the drum I provide an arm S mounted to swing substantially horizontally with the knife blade or other member M. The arm S normally engages with a stop $a^1$ on a stationary bracket and is held in position by a coil spring F as shown in Fig. 5. The tension of the spring is such that when the drum is rotating at high speed the friction caused by the engagement of the knife blade M in liquid will not overcome the tension of the spring but the increased friction caused by the engagement of the knife blade M in solid material will overcome the tension of the spring F and cause the arm S to swing away from the stop $a^1$. The tension of this spring may be regulated by a thumb screw $F^m$ on the end of a link $R^1$ attached to one end of the spring.

Mounted on the bracket is a lever $H^1$ having a depending arm $D^1$ normally engaging with the end of the arm S, so that the latter constitutes a positive stop to the swinging of the lever $H^1$ in one direction past the position indicated in Fig. 4. A suitable spring $F^1$ normally tends to swing the lever $H^1$ away from the stop but mechanism hereinafter described and connected to the lever $H^1$ by a connecting rod or wire K more than counteracts this tendency.

For use in connection with the device illustrated in Figs. 4 and 5, I somewhat modify the device shown in Fig. 1, and may employ it in the form shown in Fig. 3. In this form I connect the rod or wire K to a bell crank lever $H^2$, having a pivot pin $y$ on the support for the bearing $1^1$ of the shaft $a$. One arm of this bell crank lever carries a weight G tending to pull down on the rod or wire K while the other arm $c$ of the bell crank lever terminates adjacent a pin $a^2$ on the clutch collar $m$ so as to move the clutch collar $m$ into operative position when the weight G is lowered.

It will be thus seen that the weight G is held in raised position with the clutch collar $m$ out of operation so long as the arm S is in such position as to prevent the swinging of the lever $H^1$. When the solid material in the drum has accumulated to such an extent as to engage with the edge of the knife blade M, the latter is moved laterally by the increased friction and the arm S is moved out of the path of the arm $D^1$. The weight may now drop and the clutch collar $m$ will be moved into operative position and the shaft $a$ caused to rotate.

In order to restore the weight G to its normal position, I may provide mechanism operated by the shaft $w$ when the latter has rotated to effect a partial rotation of the shaft $a$. It will be remembered that the shaft $a$ when once starting to rotate will make one complete revolution before stopping. For raising the weight G to permit the return of the clutch collar $m$ to inoperative position and to permit the arm S to return into locking position in respect to the arm $D^1$, I provide the shaft $w$ with a wheel $r^2$ presenting a cam $a^3$. Mounted in a stationary sleeve $u$ I provide a rod $S^2$ having one end adapted to engage with the arm $c$ of the bell crank lever $H^2$ and with the other end adapted to move into and out of the path of the cam $a^3$. This rod is free to move endwise and is normally out of the path of the cam but when the weight G lowers, the arm $c$ moves the rod endwise and at the same time effects the engageemnt of the clutch collars $m$ and $k$. During the following revolution of the shaft $w$ the cam $a^3$ will engage with the end of the rod $S^2$ to force the latter endwise and raise the weight G. The clutch collar $m$ will stay in engagement during the rest of one revolution and then will automatically disengage. The disengaging may be effected in any suitable manner as for instance by a spring, not shown.

It is of course evident that the identical mechanism shown in Fig. 3 and similar mechanism to that shown in Figs. 4 and 5 may be employed for controlling the operations or functions of various machines other than centrifugal machines, and that the arm S may be moved to set the controlling mechanism in operation upon the arrival of any predetermined condition in the material operated upon by the machine, for instance the arm S might be moved by a float when a predetermined amount of liquid accumulates in any desired container, or it might be operated when a predetermined quantity of sheet material has been wound upon a spindle. Innumerable other conditions in various types of machines might start the mechanism in operation.

Having thus described my invention what I claim is:

1. A device for controlling centrifugal separators including a normally stationary shaft, a shaft rotated at a substantially constant speed, a rotary member driven by said second mentioned shaft and at a materially slower rate, said rotary member having a circularly disposed series of openings or recesses therein, normally disengaged clutch members for driving said first mentioned shaft from said second mentioned shaft, a pin adapted to enter any one of said openings or recesses and a lever having one end operatively connected to one of said clutch members and having the opposite end in the path of circular movement of said pin.

2. A device for controlling centrifugal separators, including a normally stationary shaft, a shaft rotated at a substantially constant speed, a clutch member secured to said second mentioned shaft, a clutch member adapted to coöperate therewith and slidable on said first mentioned shaft, a stationary member coöperating with said second mentioned clutch member and preventing axial movement of the latter except when said second mentioned clutch member has been rotated to a predetermined point in respect to said stationary member, a lever for moving said second mentioned clutch member axially into mesh with said first mentioned clutch member and thereby effecting the rotation of said first mentioned shaft and said second mentioned clutch member, and means operated upon a predetermined rotation of said second mentioned shaft for swinging said lever.

3. A device for controlling centrifugal separators, including a normally stationary shaft, a shaft rotated at a substantially constant speed, a clutch member secured to said second mentioned shaft, a clutch member adapted to coöperate therewith and slidable on said first mentioned shaft, a stationary member coöperating with said second mentioned clutch member and preventing axial movement of the latter except when said second mentioned clutch member has been rotated to a predetermined point in respect to said stationary member, and means operated upon a predetermined rotation of said second mentioned shaft for moving said second mentioned clutch member axially into mesh with said first mentioned clutch member and thereby effecting the rotation of said first mentioned shaft and said second mentioned clutch member.

Signed at Hanover, Germany this twenty-fourth day of November, A. D. 1913.

GUSTAV ter MEER.

Witnesses:
AUGUST PRISS,
T. HENDY REED.